(12) United States Patent
Guerry et al.

(10) Patent No.: US 8,361,179 B2
(45) Date of Patent: Jan. 29, 2013

(54) CYCLONE SEPARATOR DEVICE FOR GAS-OIL SEPARATION

(75) Inventors: Pascal Guerry, Seppois le Bas (FR); Antony Nollevaux, Champfromier (FR); Thierry Fohrer, Champfromier (FR); Herve Martinengo, Chilly (FR)

(73) Assignee: MGI Coutier (FR)

( * ) Notice: Subject to any disclaimer, the term of this patent is extended or adjusted under 35 U.S.C. 154(b) by 157 days.

(21) Appl. No.: 12/745,626

(22) PCT Filed: Nov. 27, 2008

(86) PCT No.: PCT/FR2008/001652
§ 371 (c)(1), (2), (4) Date: Nov. 1, 2010

(87) PCT Pub. No.: WO2009/098399
PCT Pub. Date: Aug. 13, 2009

(65) Prior Publication Data
US 2011/0041695 A1    Feb. 24, 2011

(30) Foreign Application Priority Data
Nov. 30, 2007 (FR) .................................. 07 08388

(51) Int. Cl.
*B01D 47/00* (2006.01)
(52) U.S. Cl. ............. 55/426; 55/447; 55/456; 55/459.1; 55/462; 55/337; 55/345

(58) Field of Classification Search .................... 55/447, 55/456, 459.1, 462, 337, 345
See application file for complete search history.

(56) References Cited

U.S. PATENT DOCUMENTS

| | | | |
|---|---|---|---|
| 3,597,901 | A | 8/1971 | Heeney |
| 4,094,794 | A | 6/1978 | Kahmann |
| 5,947,300 | A | 9/1999 | Lange |

FOREIGN PATENT DOCUMENTS

| | | |
|---|---|---|
| DE | 1292479 B | 4/1969 |
| EP | 1180400 A1 | 2/2002 |
| FR | 2588779 A1 | 4/1987 |

OTHER PUBLICATIONS

International Search Report; PCT/FR2008/001652; Jul. 21, 2009.

*Primary Examiner* — Jason M Greene
*Assistant Examiner* — Dung H Bui
(74) *Attorney, Agent, or Firm* — Cantor Colburn LLP

(57) ABSTRACT

This cyclone device performs diphasic gas-oil separation to remove oil from the recirculated crank cases of an internal combustion engine. Mounted such that it can move vertically inside the cyclone is a body (7) exhibiting symmetry of revolution, particularly one of cylindro-conical overall shape. The body (7) delimits, with the walls of the cylindrical collecting zone (2) and/or of the conical zone (3) for recuperating the liquid oil, an annular gap (13) such that the passage cross section can vary according to the self-adjusting heightwise position of the body (7), as a function of the gas flow rate. The speed of the gases thus remains constant for variable gas flow rates.

10 Claims, 2 Drawing Sheets

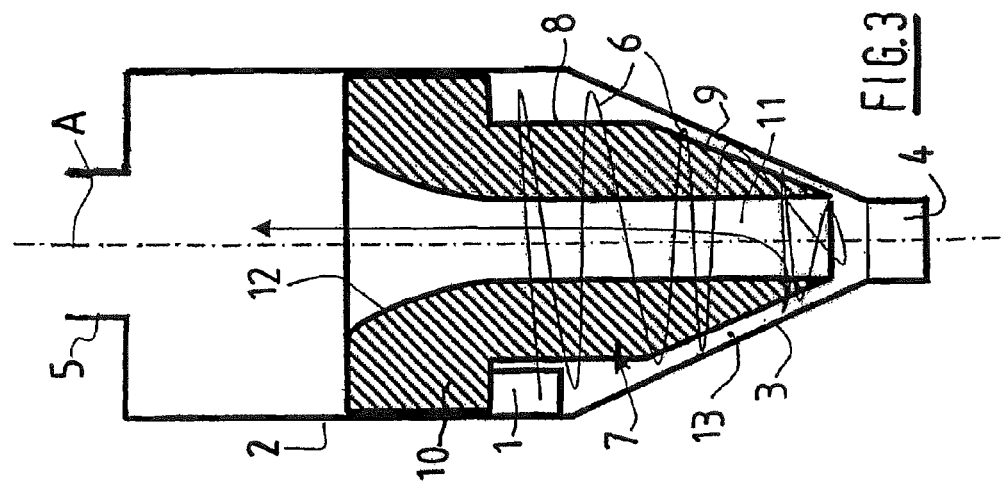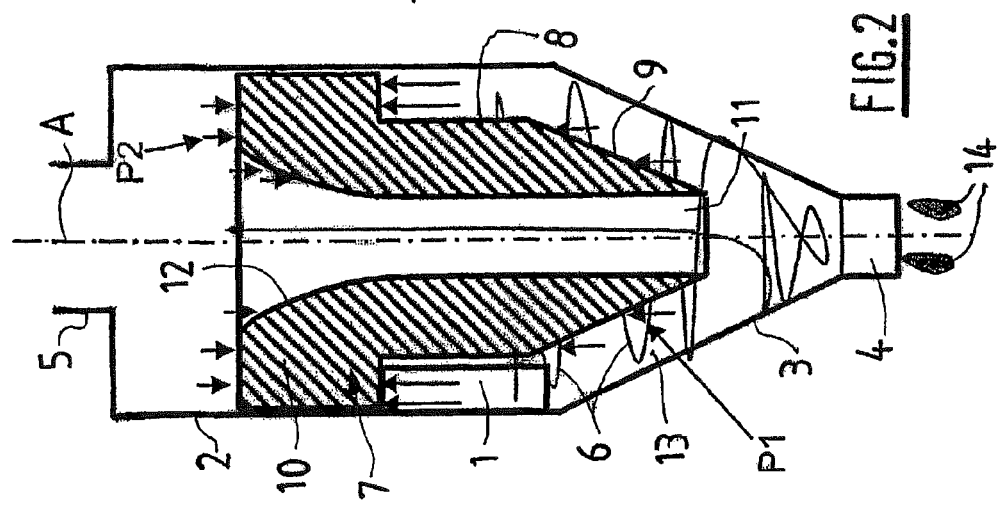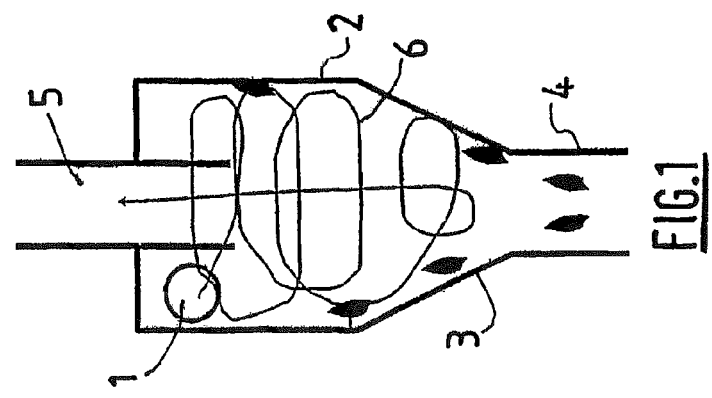

CYCLONE SEPARATOR DEVICE FOR GAS-OIL SEPARATION

TECHNICAL FIELD

The invention relates in general to separator devices of the kind known under the heading of "cyclone" separators. More specifically, this invention applies to a cyclone separator device intended for diphasic gas-oil separation in an internal combustion engine, and more specifically still, to a separator designed to separate and recover liquid oil particles contained in the recirculated crank case gases of an internal combustion engine, notably of a motor vehicle.

BACKGROUND

Devices, also known as "oil separators" or "oil traps" already exist and are incorporated into the cylinder head cover of an internal combustion engine and comprise, firstly, means designed to remove the liquid oil that enters the cylinder head cover and, secondly, means designed to remove oil droplets or particles from the crank case gases.

In order to carry out this diphasic gas-oil separation, it is possible to plan on using a cyclone, which exploits the inertia of the oil droplets or particles by making them spin in a gas flow, in order to throw them, under centrifugal force, against walls along which they will flow downward, notably under the effect of gravity, in order ultimately to be recovered and removed.

As FIG. 1 of the attached schematic drawing shows, a conventional cyclone designed to separate a liquid phase from a gaseous phase comprises, from top to bottom:
- an upper tangential inlet 1 for the gases that contain droplets or liquid particles that are to be removed,
- a cylindrical zone 2 for collecting the droplets or particles,
- a conical zone 3 for recovering the droplets or particles,
- a lower zone 4 for discharging and/or storing the separated-off liquid phase.

The cyclone also usually has an upper opening 5 at its top acting as an axial outlet for the gases, which have been separated from the particles or droplets they used to contain, the path 6 of the gases through the cyclone being first of all downward and helical, then upward and tending toward an axial direction.

The effectiveness of such a cyclone is connected to the speed of the gaseous flow passing through it: the higher the speed of the flow, the greater the inertia possessed by the droplets or liquid particles which will therefore be thrown more violently and more reliably against the walls, particularly the cylindrical wall of the collection zone.

Thus, in order to achieve maximum effectiveness, the speed of the gaseous flow within the cyclone ought to be as high as possible. However, in the application under consideration here, the speed of the gaseous flow through the cyclone is not constant but is dependent on the flow rate of crank case gases produced by the internal combustion engine, this gas flow rate itself varying as a function of engine speed and load. In particular, under part-load conditions, the flow rate of crank case gases is lower than it is under full load. Likewise, for low engine speeds, the speeds of the gases are lower, and the effectiveness of the cyclone is therefore lower. It may thus be considered that high cyclone efficiency corresponds to high gas flow velocities and that low cyclone efficiency corresponds to low gas flow velocities, at least if the geometric characteristics of the cyclone remain unchanged.

Simply increasing the speed of the flow, particularly for low flow rates, would not provide a satisfactory solution to the problem addressed here because by setting a high speed for low flow rates, notably by reducing the dimensions of the cyclone, a pressure drop would be created that would prove too great for high flow rates.

Conversely, sizing the cyclone in order to limit the pressure drop at high flow rates would yield a cyclone that was even less effective at low flow rates.

One other potential solution might be to vary the cross section of the upper gas inlet to the cyclone, reducing this cross section when the gas flow rate is low, and increasing this cross section when the gas flow rate is high, so that the gases always enter the cyclone at the same speed. That could provide a certain degree of improvement, if it is reckoned that the speed of the gases on entering the cyclone is maintained over part of the path of these gases through the cyclone. However, the sudden variations in cross section would in this case create pressure drops which would restrict the initial energy of the jet of gas.

In order to find a suitable solution to the problem addressed here, and therefore in order to maintain constant and, if possible, high cyclone efficiency for any incoming gas flow rate, it would therefore appear preferable not to alter the gas inlet conditions, or the inlet alone, but to impose a constant speed on the flow actually inside the cyclone, using suitable regulation measures.

BRIEF SUMMARY

The disclosure seeks to avoid the aforementioned disadvantages by providing a solution that, whatever the gaseous flow rate entering the cyclone, ensures that the speed of the flow within the cyclone remains constant, so as to obtain cyclone efficiency which itself remains constant, without introducing additional pressure drops.

To this end, the subject of the invention is a cyclone separator device designed to separate and recover liquid oil particles contained in the recirculated crank case gases of an internal combustion engine, particularly of a motor vehicle, the cyclone device comprising, from top to bottom:
- an upper tangential gas inlet,
- a cylindrical oil-collection zone,
- a conical zone for recovering the particles, notably liquid-oil,
- a zone for discharging and/or storing the oil that has been separated, while an upper axial gas outlet opening is also provided, this cyclone separator device being essentially characterized in that mounted so that it can move vertically and possibly rotationally, inside the cyclone in the cylindrical oil-collection zone and/or in the conical oil-recovery zone is a body with symmetry of revolution delimiting, with the walls of said zones, an annular gap such that the passage cross section for the gases varies according to the self-adjusting heightwise position of the aforementioned body, itself as a function of the flow rate of the gases, it thus being possible for the speed of the gases to remain substantially constant for gas flow rates that vary.

Admittedly, cyclones, particularly of the "hydrocyclone" type, that is to say cyclones in which the liquid phase is the dominant phase, and in which a central body of cylindrical or conical or some other shape with symmetry of revolution can be adjusted in terms of axial position, are known (see patent documents EP 1180400 and FR 2588779, and also DE 1292479). However, in those embodiments, the heightwise position of the central body is initially mechanically set by hand, and remains unchanged during operation; said body is not free to move vertically, adopting of its own accord a variable position of equilibrium through a self-regulating effect.

In a preferred embodiment of the invention, the body with symmetry of revolution is a body of cylindro-conical overall exterior shape, the cylindrical part of which is in register with the cylindrical oil-collection zone and the conical part of which is in register with the conical oil-recovery zone, said body being pierced, along its central axis, with an internal duct so that gases can rise up toward the upper axial gas outlet opening. Advantageously, the internal duct of the aforementioned body widens at its downstream end, that is to say at the end situated toward the upper axial gas outlet opening; such a widened outlet slows the flow of the gas, creating a final expansion effect which improves the pressure drop and increases the pressures and speeds.

Thus, the invention comprises positioning, opposite the cylindrical and especially the conical, walls of the cyclone, another, mobile, cylindro-conical part which, according to its heightwise position, forms an annular gap of variable width, and therefore of variable cross section. Under the effect of the pressure drop between the inlet and the outlet of the cyclone, the cylindro-conical body rises to a greater or lesser extent and maintains a position of equilibrium, inside the cyclone, under the effect of the pressure difference between the inlet and outlet of the cyclone, the weight of said cylindro-conical body being balanced by the resultant of the pressure forces applied to the bottom part and top part of this body. More specifically, in order to maintain equilibrium irrespective of the gas flow rate, the body rises or falls, and this equilibrium is established, keeping the speed of the gaseous flow through the gap substantially constant over the entire downward helical path of this flow. The operation may be compared in part, in this respect, to that of a cone rotameter which is a kind of flow meter formed of a cone placed in a divergent section, the height of the cone in relation to the divergent section being proportional to the flow rate. In particular, in the case of a higher flow rate, the passage cross section formed by the annular gap is larger than it is in the case of a low flow rate, the cylindro-conical body rising to a greater extent, but the speed of the flow and the pressure drop remaining practically constant.

The invention does not alter the exterior structure of the cyclone, and the axial internal duct of the cylindro-conical body guides the gaseous flow, within the cyclone, toward the outlet which is also axial. The cyclone separator of the invention therefore does not require either the creation of additional parts or the modification of existing parts, the only thing being needed is the addition of the cylindro-conical body of revolution inside the cyclone.

The design of the cyclone according to the invention also affords the following advantages:
the interior cylindro-conical body can turn under the effect of the drive from the flow surrounding it, and this may bring an improvement from the point of view of the flow (by analogy with certain cyclone-type vacuum cleaners which have a rotary interior part),
the fact that the pressure drop remains constant regardless of the flow rates makes for simplified development relating to the induction of the de-oiled crank case gases by the internal combustion engine intake line, the production of crank case gas not being a direct function of the induction of the line,
the cylindro-conical body may also damp out pulsation in the line through which the crank case gases pass, like the present-day regulating membrane, said body moving "gently" as a function of flow rate and thus in particular damping out any pulsation present at the entry to the oil separator and thus smoothing out depression spikes.

Other advantageous effects may also be obtained through additional measures.

According to one of these measures, the body of cylindro-conical overall shape has a larger-diameter upper zone able to cover the upper tangential gas inlet to a greater or lesser extent according to the heightwise position of said body, a relationship thus being established between this heightwise position and the gas inlet cross section for the gases; thus the cross section of the inlet is automatically adapted to suit that of the annular gap. This embodiment therefore affords better control over the speed of the gases by establishing a correlation between the inlet cross section on the one hand, and the restriction in cross section of the variable-width annular gap on the other.

Advantageously, the annular gap delimited between the conical part of the cylindro-conical body and the wall of the conical oil-recovery zone, has a restriction in cross section at an intermediate point along its height. The restriction in cross section of the annular gap results, for example, from an interior profile that is locally concave, notably in the form of a paraboloid of revolution, of the wall of the conical oil-recovery zone. This restriction in cross section increases the pressure in the gas inlet zone, giving the cylindro-conical body better lift.

In addition, the shapes of the conical part of said body and of the wall of the conical recovery zone of the cyclone, are advantageously matched to one another in such a way as to obtain an annular gap of a cross section that increases downward, and therefore toward the smaller diameters, so as to obtain a gas speed that remains substantially constant at any height.

There are various design factors that may influence the speed (that remains substantially constant irrespective of the flow rate) of the gases in the annular gap. In addition to the profile of the conical parts which define this gap, the choice of the weight and therefore of the material of which the cylindro-conical body is made allows for a reduction or increase in speed; a heavier body will lead to a narrower gap, and therefore to a higher speed. Increasing the weight of the body may advantageously be replaced by sprung means, such as a helical compression spring housed in the cylindrical oil-collection zone urging the body with symmetry of revolution downward to bring it into a position of equilibrium. Adjusting the spring stiffness can be used here to influence the speed of the gases.

Admittedly, U.S. Pat. No. 5,947,300 already discloses a cyclone in which a moving internal body, in the form of a piston, has a spring acting upon it. However, in that document, the spring is used to bring said body into a wide open or closed position; it plays no part in keeping the body in an intermediate position that is a position of equilibrium.

The cyclone may further comprise actuating means, such as a pneumatic actuator, controlling the position and vertical displacement of the body with symmetry of revolution in order to regulate the speed of the gases.

The cyclone may comprise motorized means such as an electric motor for rotating the body with symmetry of revolution in a direction that corresponds to that of the helical path of the gases in the annular gap.

BRIEF DESCRIPTION OF THE DRAWINGS

The invention will be better understood from the description which follows, with reference to the attached schematic drawing, which, by way of examples, depicts a few embodiments of this cyclone separator device and illustrates how it works:

FIG. 1 (already mentioned) is a view in vertical section of a conventional cyclone;

FIG. 2 is a view in vertical section of a cyclone according to the present invention, in a first operating position corresponding to high flow rates;

FIG. 3 is a view in vertical section of the cyclone of FIG. 2, in a second operating position corresponding to low flow rates;

DETAILED DESCRIPTION

Figure 4:
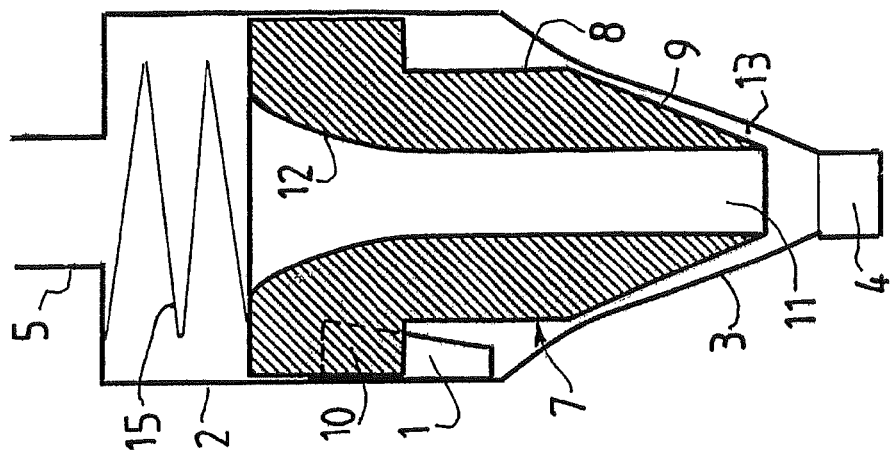
FIG. 4 is a view in vertical section of a first alternative form of the cyclone according to the invention.

FIGS. 2 and 3 depict a cyclone separator device the fixed part of which corresponds to the structure of a conventional cyclone and comprises, from top to bottom: an upper tangential inlet 1 for the gases containing the oil that is to be removed, a cylindrical zone 2 for collecting the oil droplets, a conical zone 3 for recovering the oil droplets and a lower oil outlet zone 4. The cyclone also comprises, at its top, an upper axial gas outlet opening 5, to which a suction pipe (not depicted) can be connected.

A body of revolution 7 of cylindro-conical overall shape is mounted, such that it can move vertically and also such that it is free to turn, inside the cyclone. The body 7 has a cylindrical part 8 situated in register with the cylindrical collection zone 2, and a conical lower part 9 situated in register with the conical recovery zone 3. The body 7 also has a larger-diameter upper zone 10 situated at the level of the upper tangential inlet 1. The body 7 is pierced vertically, along its central axis A, with an internal duct 11 which widens at its upper outlet 12 connected to the upper gas outlet opening 5.

An annular gap 13 is delimited, particularly during operation, between the walls of the cylindrical 2 and conical 3 zones of the cyclone, on the one hand, and the corresponding cylindrical 8 and conical 9 parts of the body 7, on the other.

During operation, gases arriving via the upper tangential inlet 1 describe a path 6 which is first of all downward and helical, in the annular gap 13, as far as the base of the body 3. These gases then travel from the bottom upward through the internal duct 11 of the body 3 and ultimately leave the cyclone via the upper opening 5. During the downward movement of the gases, the oil droplets 14 are thrown against the wall of the cylindrical zone 2, then run down along the wall of the conical zone 3 until they are finally collected and removed in the lower zone 4 of the cyclone. The gases passing through the duct 11 and leaving via the upper opening 5 are thus separated from the oil they used to contain.

More specifically, as FIG. 2 illustrates, in the case of high gas flow rates, the cylindro-conical body 7 rises up inside the cyclone, equilibrium thus being established between the weight of the body 7, the pressure forces P1 applied to the bottom part of the body 7, and the pressure forces P2 applied to the upper part of this body 7. The annular gap 13 is thus large.

By contrast, as FIG. 3 illustrates, in the case of low gas flow rates, the cylindro-conical body 7 falls, accordingly altering the width of the annular gap 13, the device thus automatically "self-regulating" such that the speed of the gases remains substantially constant irrespective of the flow rate in the annular gap 13.

In this operation, the larger-diameter upper zone 10 of the cylindro-conical body 3 covers the upper tangential gas inlet 1 to a greater or lesser extent thus adapting the working cross section of this inlet 1 to suit the variable passage cross section offered by the annular gap 13. In so far as the inlet 1 is of rectangular shape, the passage cross section is proportionate to the height by which the body 7 rises.

In the simplest embodiment illustrated in FIGS. 2 and 3, the conical part 9 of the body 7 has a perfectly conical shape, as does the wall of the conical oil-droplet-recovery zone 3, the two conical parts being substantially parallel.

In a first alternative form, depicted in FIG. 4, the wall of the conical oil-droplet-recovery zone 3 has an internal profile that is locally concave, notably a parabolic profile, so that at an intermediate point along its height, the annular gap 13 has a certain restriction in cross section. This restriction increases the pressure on the gas inlet side, and causes more pronounced lifting of the body 3.

Figure 5:
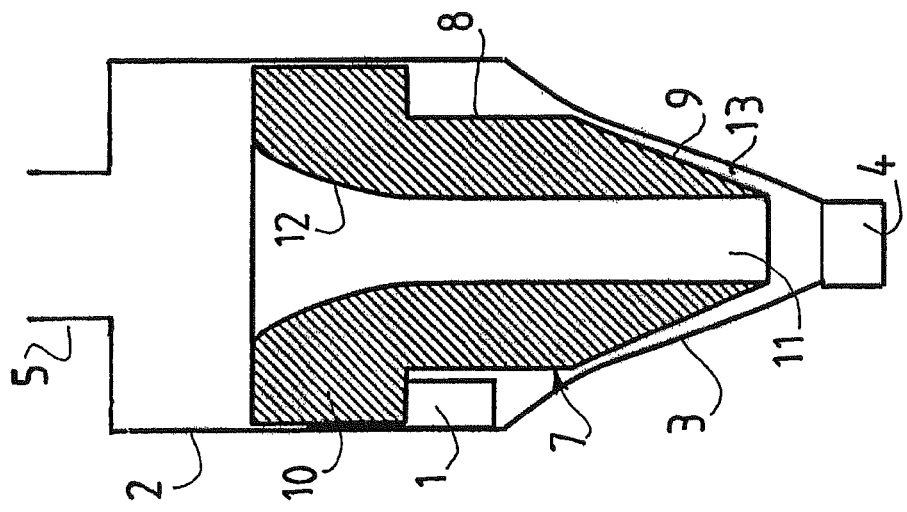
FIG. 5 is a view in vertical section of a second alternative form of the cyclone according to the invention.

In a second alternative form depicted separately in FIG. 5 (but which may be combined with the previous one), the wall of the conical oil-droplet-recovery zone 3 and the conical part 9 of the body 7 have profiles which diverge downward, so that the width of the annular gap 13 increases from top to bottom, and therefore toward the smaller diameters of this gap 13. With this configuration, the speed of the gases in their downward path is kept substantially constant at any height.

Figure 6:
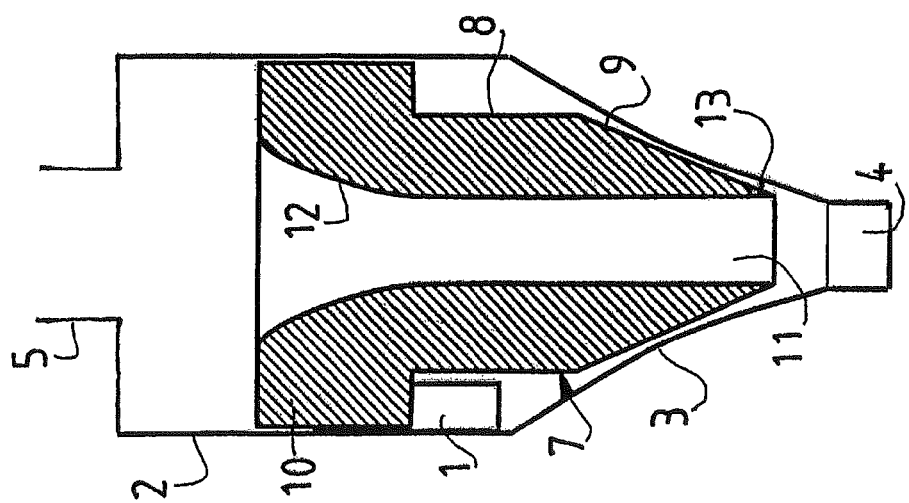
FIG. 6 is a view in vertical section of another embodiment of this cyclone, fitted with a spring.

FIG. 6 depicts a third alternative form, that may be combined with the previous two, in which a helical compression spring 15 is mounted inside the cyclone, in the upper part, and urges the cylindro-conical body 7 downward, to increase the speed of the gaseous flow in the annular gap 13. This FIG. 6 also shows a variation in shape of the upper tangential gas inlet 1, which here is of trapezoidal rather than rectangular shape, so that the passage cross section is no longer proportionate to the height via which the body 7 rises, affording a certain degree of correction.

The spring 15 could simply be replaced by a cylindro-conical body 7 that is made heavier, particularly by making it out of a material that is more dense, for the same volume.

The body 7 can be made of various materials of greater or lesser density, particularly materials that can be injection-molded or cast; metals such as lead, metal alloys such as zinc-based alloys known as "zamac", synthetic materials such as polyamide or aramid, possibly including a metal filler.

In another alternative form that has not been illustrated, an actuator of the cylinder actuator type could also be used to apply a controlled vertical force to the body 3 in order to position it vertically at the desired height.

The invention is not restricted merely to the embodiments of this cyclone separator device that have been described hereinabove by way of examples but on the contrary encompasses all alternative forms of embodiment and of application that fall within the scope of the attached claims, regardless in particular of the details regarding the shape of the cyclone and of the body housed within it.

Any additional arrangements such as the addition of end stops that limit the axial travel of the aforementioned body and/or that damp the arrival of this body at the end of its travel also fall within the scope of the present invention.

The invention claimed is:

1. A cyclone separator device designed to separate and recover liquid oil particles contained in recirculated crank case gases of an internal combustion engine, particularly of a motor vehicle, the cyclone device comprising, from top to bottom:

an upper tangential gas inlet,
a cylindrical oil-collection zone,
a conical liquid-oil-recovery zone,
a zone for discharging and/or storing the oil that has been separated, and
an upper axial gas outlet opening,
wherein a body with symmetry of revolution is mounted so that it can move vertically inside the cyclone in the cylindrical oil-collection zone and/or in the conical oil-recovery zone, the body delimiting with walls of said cylindrical oil-collection zone and/or said conical oil-recovery zone, an annular gap such that a passage cross section for gases varies according to a self-adjusting heightwise position of the body as a function of a flow rate of the gases, it thus being capable for a speed of the gases to remain substantially constant for variable gas flow rates.

2. The cyclone separator device as claimed in claim 1, wherein the body with symmetry of revolution is a body of cylindro-conical overall shape, a cylindrical part of which is in register with the cylindrical oil-collection zone and a conical part of which is in register with the conical oil-recovery zone, said body being pierced, along a central axis, with an internal duct so that gases can rise up toward an upper axial gas outlet opening.

3. The cyclone separator device as claimed in claim 2, wherein the internal duct widens at its downstream end, at the end situated toward the upper axial gas outlet opening.

4. The cyclone separator device as claimed in claim 2, wherein the body of cylindro-conical overall shape has a larger-diameter upper zone able to cover the upper tangential gas inlet to a greater or lesser extent according to the heightwise position of said body of said cylindrico-conical overall shape, a relationship thus being established between this heightwise position of said body of said cylindrico-conical overall shape and the gas inlet cross section for the gases.

5. The cyclone separator device as claimed in claim 2, wherein the annular gap delimited between the conical part of said body and the wall of the conical oil-recovery zone, has a restriction in cross section at an intermediate point along the height of the annular gap.

6. The cyclone separator device as claimed in claim 5, wherein the restriction of the annular gap results from an interior profile that is locally concave, in a form of a paraboloid of revolution, of the wall of the conical oil-recovery zone.

7. The cyclone separator device as claimed in claim 2, wherein shapes of the conical part of said body and of the wall of the conical recovery zone, are matched to one another in such a way as to obtain the annular gap of a cross section that increases downward, and therefore toward smaller diameters, so as to obtain a gas speed that remains substantially constant at a plurality of heights.

8. The cyclone separator device as claimed in claim 1, wherein sprung means comprising a helical compression spring, are provided, this spring being housed in the cylindrical oil-collection zone and urging the body with symmetry of revolution downward to bring it into a position of equilibrium of the body.

9. The cyclone separator device as claimed in claim 1, further comprising motorized means such as an electric motor for rotating the body with symmetry of revolution in a direction that corresponds to a helical path direction of the gases in the annular gap.

10. The cyclone separator device as claimed in claim 1, wherein the body with symmetry of revolution is mounted so that it can move rotationally.

\* \* \* \* \*